United States Patent [19]
Irby et al.

[11] Patent Number: 5,353,578
[45] Date of Patent: Oct. 11, 1994

[54] DRIVE SYSTEM FOR LAWN MOWERS

[75] Inventors: Robert W. Irby, McDonough; Richard A. Schaff, Conyers, both of Ga.

[73] Assignee: Fuqua Industries, Inc., McDonough, Ga.

[21] Appl. No.: 25,025

[22] Filed: Mar. 2, 1993

[51] Int. Cl.⁵ .............................. F16H 15/08
[52] U.S. Cl. .................... 56/11.1; 56/16.9; 476/58; 476/66
[58] Field of Search ............... 56/11.7, 11.8, 16.9, 56/17.5, 17.6, 11.1, 10.8; 476/24, 30, 57, 58, 65, 66; 180/19.3

[56] References Cited

U.S. PATENT DOCUMENTS

| | | |
|---|---|---|
| 986,811 | 3/1911 | Eaton . |
| 1,963,880 | 6/1934 | Barthelemy . |
| 2,552,583 | 5/1951 | Phelps . |
| 2,823,560 | 2/1958 | Harp et al. . |
| 2,857,726 | 10/1958 | Smith . |
| 2,893,501 | 7/1959 | Smith . |
| 3,035,386 | 5/1962 | Jepson et al. . |
| 3,306,016 | 2/1967 | Murphy . |
| 3,400,599 | 9/1968 | Samuta . |
| 3,445,991 | 5/1969 | Hanson et al. . |
| 3,473,622 | 10/1969 | Orr ........................ 476/30 |
| 3,527,112 | 9/1970 | Korell . |
| 3,529,482 | 9/1970 | Jackson et al. ............ 476/24 |
| 3,613,814 | 10/1971 | Prien, Jr. . |
| 3,667,304 | 6/1972 | Puffer et al. ............... 476/66 |
| 3,720,112 | 3/1973 | Enters et al. . |
| 3,795,094 | 4/1974 | Mollen et al. . |
| 4,318,266 | 3/1982 | Taube ........................ 56/10.2 |
| 4,498,552 | 2/1985 | Rouse . |
| 4,580,669 | 4/1986 | Marto ..................... 476/24 X |
| 4,739,850 | 4/1988 | Fujioka ..................... 180/19.3 |

OTHER PUBLICATIONS

Manual #06049, "Parts Manual for Snapper 21" Series 0* Standard OPP Walk Behind Mowers.
Manual #06088, "Parts Manual for Snapper Series 12 Standard Rear Engine Rider".
Manual #07012, "Service Manual for Snapper Rear Engine Riding Mowers" Series 4, 5, 6 (& Later).
Manual #06054, "Snapper Two-Stage Intermediate Snowthrower Series 2".

Primary Examiner—Ramon S. Britts
Assistant Examiner—James A. Lisehora
Attorney, Agent, or Firm—Jones & Askew

[57] ABSTRACT

A lawn mower is provided with a speed control mechanism which is controlled by a single cable. A return spring, floating power transfer shaft, and biasing assembly provide a speed control mechanism which is effective in design and operation.

5 Claims, 4 Drawing Sheets

DRIVE SYSTEM FOR LAWN MOWERS

TECHNICAL FIELD

This invention relates in general to lawn mowers, and more particularly relates to walk-behind lawn mowers having self-propelling features.

BACKGROUND OF THE INVENTION

In the design, manufacture, and sale of lawn mowers, a need has been recognized in the industry to provide such lawn mowers which have "self-propelling" features, namely features which allow a user to engage a drive system which, while being controlled by the operator, propels the lawn mower with little or no effort forward pushing assistance from the operator. Advantages of such system are obvious, not the least being less fatigue on the operator.

Although such self-propelled configurations are known in the art, needs nevertheless exist for such systems which are inexpensive to operate and maintain, yet are reliable.

SUMMARY OF THE INVENTION

The present invention therefore provides an improved lawn mower construction having a self-propelling feature, which is simple to operate and maintain, and is cost-efficient to maintain. Generally described, the present invention provides a floating rubber friction ring assembly, which may be moved through a range from a first "slow speed" position to a second "faster speed" position relative to a friction disk by means of a wire cable, and is returned to that first position by means of a spring upon release of the wire cable.

Therefore, it is an object of the present invention to provide an improved lawn mower.

It is a further object of the present invention to provide an improved lawn mower which has a self-propelling feature.

It is a further object of the present invention to provide an improved lawn mower having a self-propelling assembly which is simple to operate and maintain.

Therefore, it is an object of the present invention to provide an improved lawn mower having a self-propelling assembly which is cost-effective to manufacture and operate.

It is a further object of the present invention to provide a self-propelling assembly in a walk-behind lawn mower which provides a plurality of forward speeds for the lawn mower.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

General Construction and Operation

Referring now to the figures, in which like numerals identify like elements throughout the several views, FIGS. 1–4 combine to illustrate a walk-behind lawn mower having a self-propelling configuration according to the present invention.

For purposes of this discussion, the "rear" of the lawn mower will be the side from which the operator typically operates the mower during the cutting process. The "right" side of the lawn mower is to operator's right side when typically operating the mower during the cutting process.

The Drive Train

Figure 1:
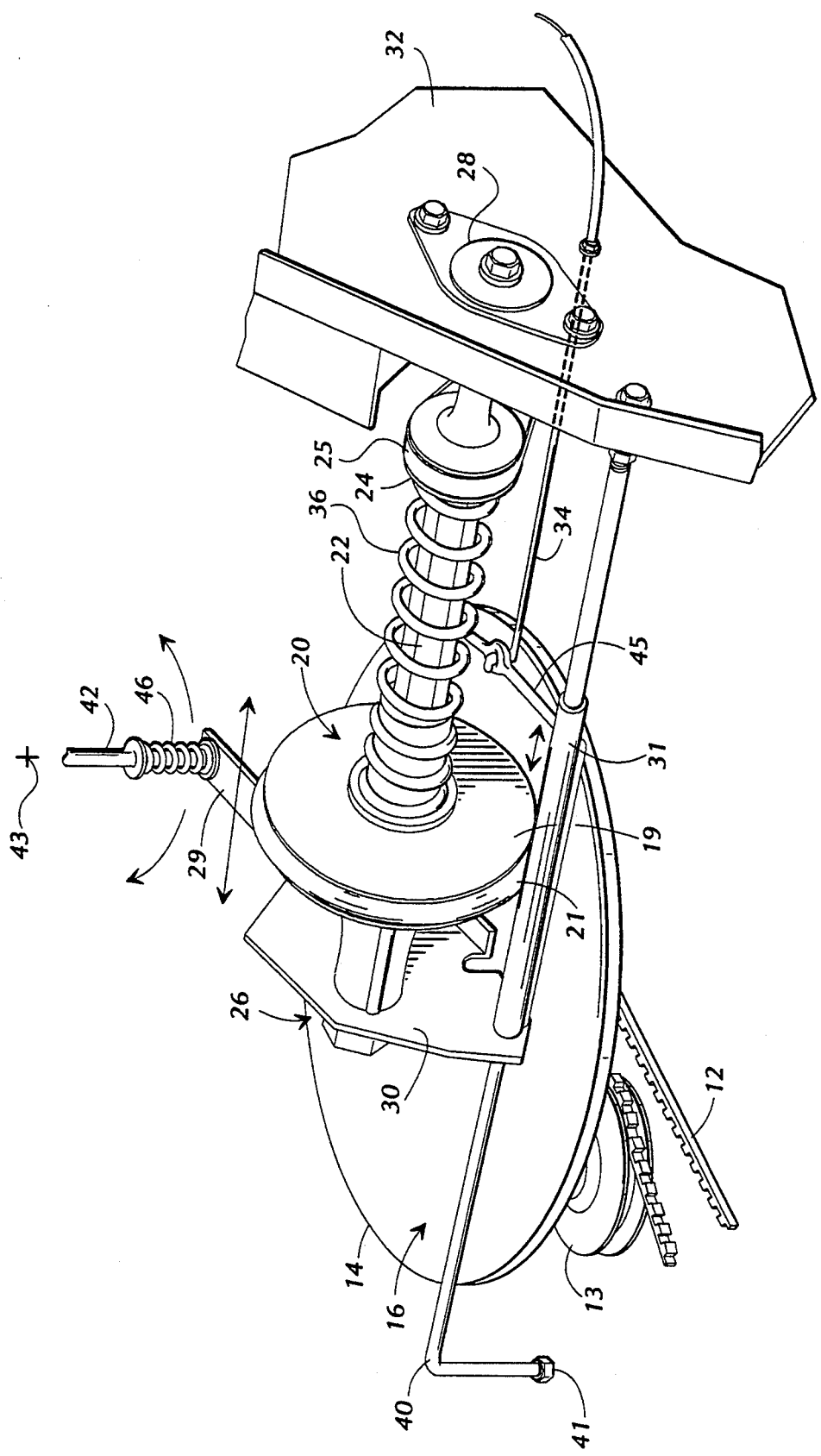
FIG. 1 is a pictorial view of a speed control assembly according to the present invention.
Figure 2:
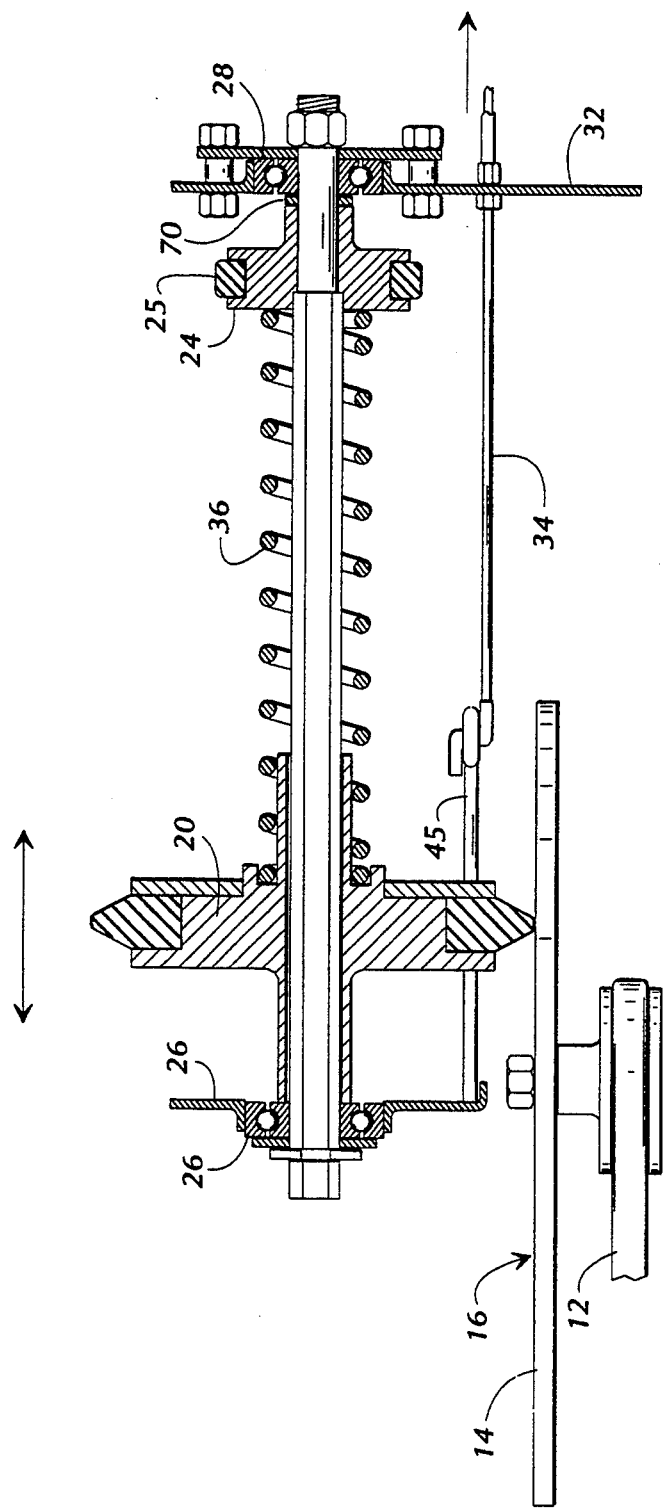
FIG. 2 is a partial cross-sectional view, as viewed from the front of the lawn mower, of a portion of the construction shown in FIG. 1.
Figure 3:
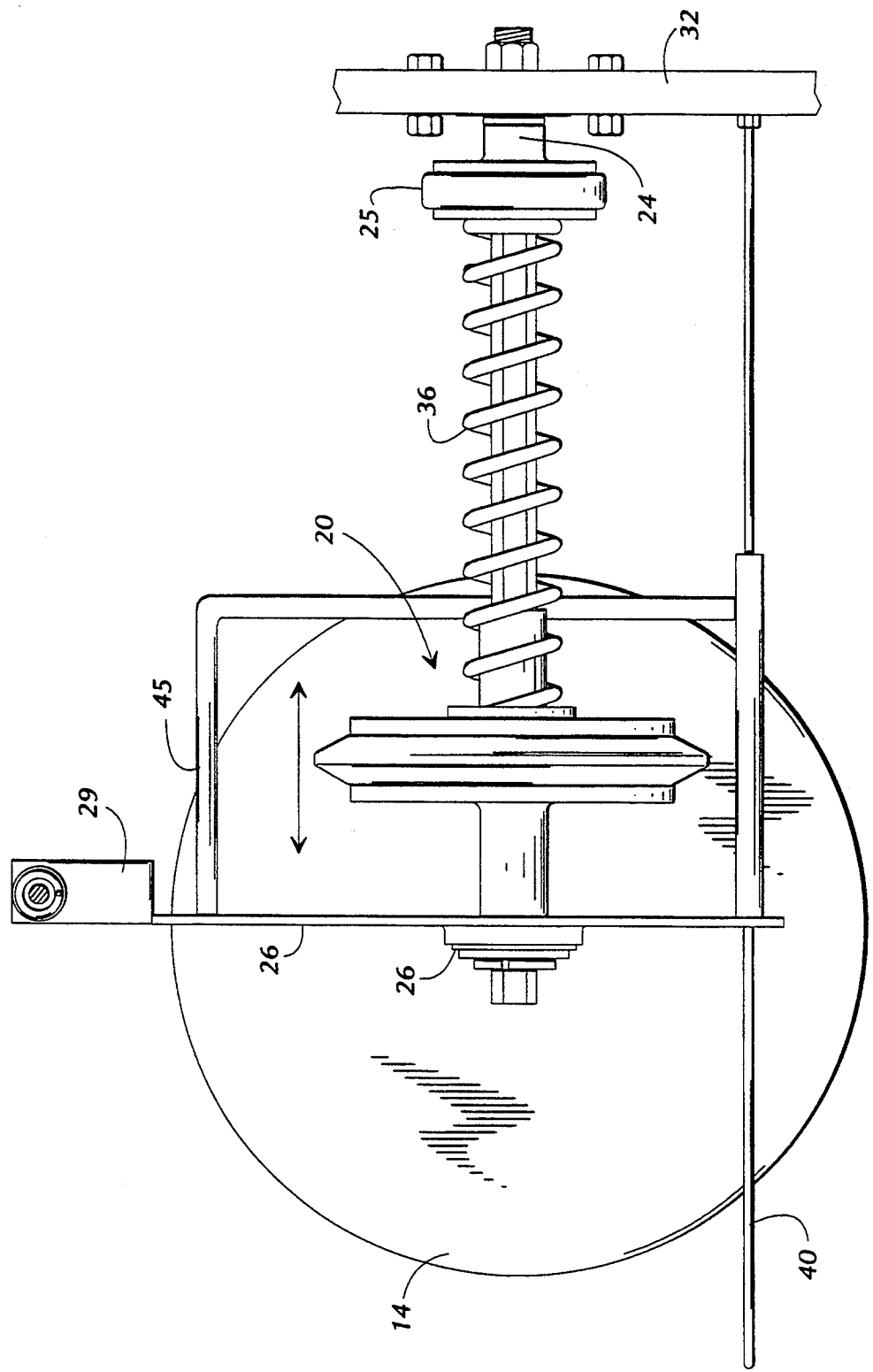
FIG. 3 is a top view of a portion of the construction shown in FIG. 1.

Referring particularly to FIGS. 1 and 2, a speed control mechanism 10 is illustrated, which operates in conjunction with a clutch mechanism (not completely shown but discussed later). A flexible endless drive belt 12 is looped around a pulley (not shown) itself attached to the vertical drive shaft (not shown) of the motor used for the lawn mower. This belt 12 is also looped around a biasing idler pulley 13 as well as another pulley (not shown) which is rigidly attached relative to and underneath a friction disk 14.

The belt 12 rotatably drives the friction disk 14 which rotates about a substantially vertical axis, and has an upwardly-directed substantially horizontal contact surface 16 which is in frictional contact with a rubber ring member 20, which itself is mounted to a main shaft 22. This main shaft is substantially hexagonally-shaped in transverse cross section throughout most of its length. The main shaft 22 is allowed to rotate about its substantially horizontal longitudinal axis by means of a pair of bearings 26, 28. Beating 26 is mounted to a pivoting flange member 30, and bearing 28 is mounted to a wall portion 32 of the body of the lawn mower.

As the friction disk 14 drives the rubber ring member 20, the rubber ring member 20 itself rotatably drives the main shaft 22. The main shaft 22 itself rotates a fixed pulley 24 mounted thereon, and the pulley 24 drives an endless clutch belt 25. A spacer 70 is between the pulley 24 and wall portion 32. As discussed in detail further, this endless belt 25 drives a differential pulley (not shown), which causes a differential or other gearbox to drive the rear wheels of the mower.

The floating friction ring member 20 includes a rubber portion 21, and a body 19. The body 19 is slidably mounted relatively to the main shaft 22, such that it may slide along the length of the shaft 22, but may not rotate relative to the shaft due to the interaction of its hex-shaped bore which matingly fits upon the hex-shaped main shaft.

The Speed Change Feature

As previously discussed, the present invention allows an operator to select a range of forward speeds for the lawn mower, for a particular engine speed. This is done by movement of the friction ring member 20 along a length of the main shaft 22.

Referring again to FIGS. 1 and 2, a bearing 26 is provided to allow the main shaft 22 to rotate relative to the pivoting flange member 26. The inner ring of this bearing 26 is not fixed to the main shaft 22, but includes a hexagonal bore to allow it to slide along a length of the main shaft 22 along with the friction ring member 20. However, the inner race of the bearing does rotate with the shaft. The outer race of the bearing does not rotate with the shaft, but is fixed relative to the pivoting flange member 26.

A compression return spring 36 is coaxially positioned on the main shaft 22. One end of the compression return spring 36 is biased against the friction ring member 20, and the opposite end biases against the pulley 24. This compression return spring 36 at all times maintains a rightward bias (as viewed by the operator) on the friction ring member 20.

Referring particularly to FIG. 1, an L-shaped guide bar 40 has one end attached to the wall portion 32 of the lawn mower, and has its opposite end attached to the body of the lawn mower at 41. This L-shaped guide bar 40 is substantially rigidly fixed relative to the body of the lawn mower.

The pivoting flange member 30 includes a collar 31, which is configured to slide along a horizontal length of the L-shaped guide bar 40, and to pivot about the longitudinal axis of the horizontal portion of the L-shaped guide bar 40 as discussed in detail below. A U-shaped yoke member 45 has each of its ends rigidly attached to the pivoting flange member 26. A speed control cable 34 is attached to the U-shaped yoke member 45.

When a sufficiently strong tensile force is placed upon this cable 34, it pulls the U-shaped yoke member 45, the attached pivoting flange member 26, and the friction ring member 20 toward the wall portion 32 of the mower, such that the return spring 36 is further compressed. Once the desired position of these members is achieved, and this sufficient force is maintained on this cable, the members 45, 26, and 20 will remain in place. However, when it is desired to move the members 45, 26, and 20 away from the wall portion 32 of the mower (so as to reduce the forward speed of the mower), this tensile force is lessened until the compression spring 36 force is sufficient to move the elements 45, 26, and 20 away from the wall portion 32.

As may be understood, depending on the position of the friction disk assembly relative to the main shaft, different speeds may be achieved of the friction ring for a given speed of the friction disk. In the preferred embodiment, the further the friction ring is moved to the left (from the operators view), the faster the friction ring (as well as the main shaft) rotates for a given speed of the friction disk. Therefore, an operator may manually adjust the speed of the mower without adjusting the speed of the engine, which is typically done by throttle control. This is advantageous in that a efficient engine speed may be maintained while varying the driven speed of the lawn mower.

In the preferred embodiment, a multi-positioned speed control lever 48 is positioned in the location of the handle controls, such that an operator may manual select a handle position. Selection of a handle position likewise selects position of the speed control cable 39 along its length, thus selecting the position of the friction disk assembly.

When an operator desires to lower the speed of the lawn mower for a given engine speed, the lever is then moved such that the cable is "fed out", or in other words the tensile force on the cable 34 is lessened such that the compression spring overcomes the tensile force and allows the cable to be "fed out". It is preferable to do this while the mower is being propelled. Such movement caused by the compression springs causes the friction ring assembly to move rightwardly, relative to the operators view, causing the speed of lawn mower to be lessened for a given engine speed.

The Biasing Feature

As previously discussed, the pivoting flange member 30, while being able to slide relative to the L-shaped guide bar 40, also is allowed to pivot about the longitudinal axis of the horizontal portion of the bar 40. This pivoting allows for a constant downward bias to be provided on the friction ring member 20 to encourage it frictional engagement with the friction disk 14.

It should be understood that the bearings 26, 28 not only allow the main shaft 22 to rotate along its longitudinal axis, but also allows the shaft to pivot somewhat about the bearings 26, 28, providing what could be termed desirable "slack" in the bearings.

Referring now to FIG. 1, a flange 29 extends from the rear of the pivoting flange member 26 and is rigidly attached thereto. A hole is provided in the flange 29, through which extends a pivoting bias rod 42, which is substantially vertical but includes a pivoting feature about point 43, at which the upper end (not shown) of this rod 42 is pivotably mounted relative to the body of the lawn mower. In the mid section of the rod is rigidly mounted a circular washer 44. The upper end of a compression spring 46 biases against this washer 44, and the lower end of a the compression spring biases against the flange 29 of the pivoting flange member 26.

As may be understood, the spring 46 provides a downward bias on the flange 29 of the pivoting flange member 26. This downward bias causes a downward bias of the friction ring member 20 against the friction plate 14, which provides for improved engagement of the ring member 20 and the plate 14, and also provides a "take-up" feature, as typically during use such friction rings tend to wear down. It may be understood that as friction wears the ring down, the biasing feature will take up, to a certain degree, some slack, while still allowing the friction disk to be frictionally engaged with the friction disk.

Controls/Overall Operation

Figure 4:
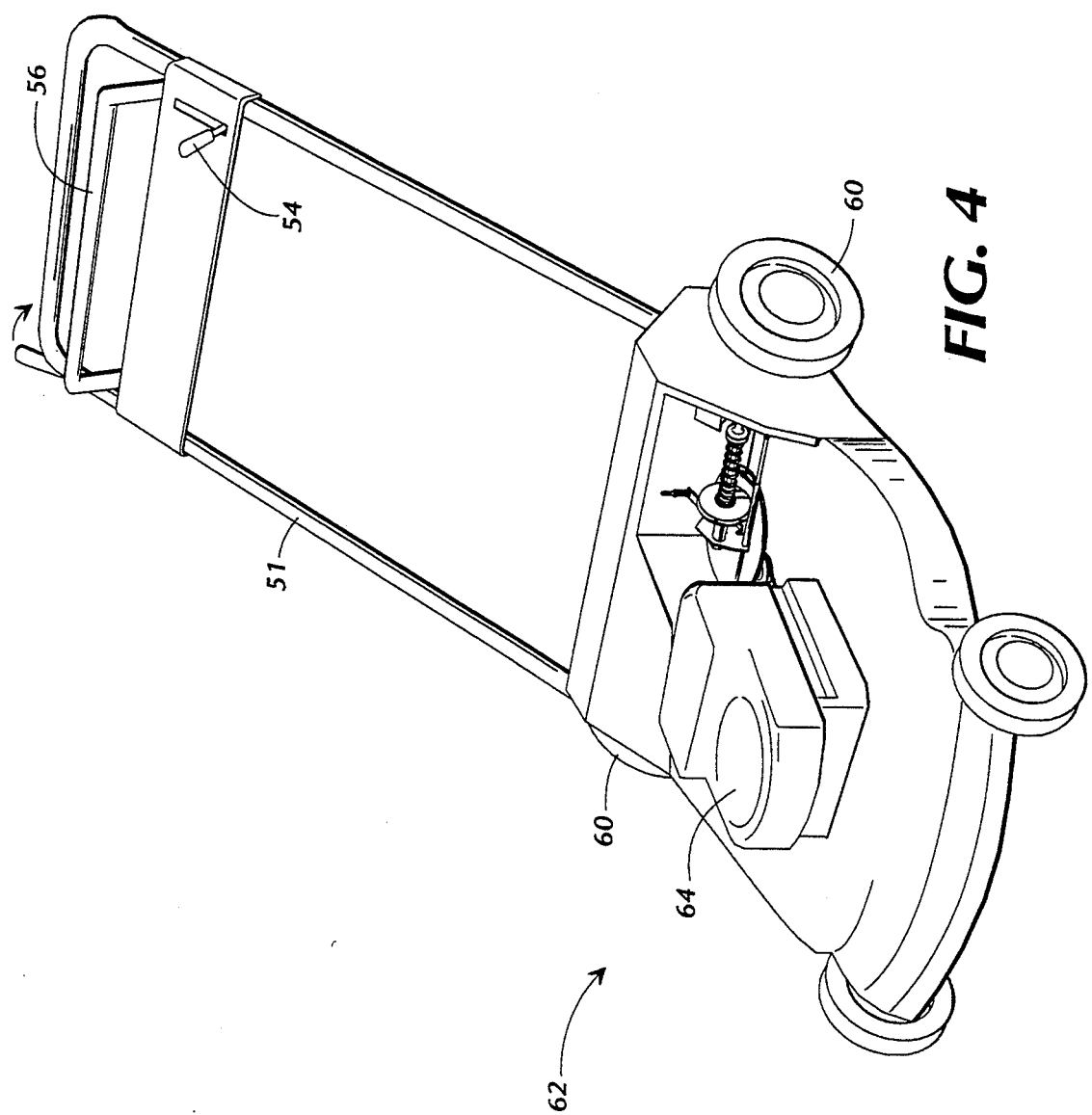
FIG. 4 is a pictorial view of a lawn mower according to the present invention, with a cover removed to show the mechanism of FIG. 1.

Referring now to FIG. 4, the control levers of the lawn mower according to the present invention are illustrated. A clutching engagement lever 52 is provided on the rightward side of the handle assembly 51 (as viewed by the operator). This clutch lever 52, when in its engaged position, causes an idler pulley (not shown) to extend such that the belt 25 (see FIGS. 1-3) drives a differential pulley as discussed above. A speed control lever 54 is provided on the left side, as viewed by the operator. As discussed above, by moving this control lever 54, an operator can change the driven ground speed of a lawn mower for a given engine speed. In the embodiment shown in FIG. 4, the rear wheels 60 of the lawn mower 62 are powered by the engine 64, which may be an internal combustion engine or may be electric. Operator presence controls 56 and similar mechanisms may also be included in the vicinity of the handle 51 of the lawn mower.

While this invention has been described in specific detail with reference to the disclosed embodiments, it will be understood that many variations and modifications may be effected within the spirit and scope of the invention as described in the appended claims.

What is claimed is:

1. A lawn mower having a self-propelling feature, comprising:
   a frame including a blade housing;
   a motor;
   at least one drive wheel rotatably mounted relative to said frame; and
   a self-propelling assembly intermediate said motor and said wheel, said assembly itself comprising:
   a friction plate rotatably mounted relative to said frame and driven by said motor;
   a guide bar rigidly mounted relative to said frame, said guide bar having a first portion having a longitudinal axis;
   a flange mounted to said first portion of said guide bar, said flange being pivotably and slidably mounted relative to said guide bar such that said flange may pivot about and slide substantially along said longitudinal axis of said first portion of said guide bar;
   a drive shaft having a longitudinal axis substantially parallel to the longitudinal axis of said first portion of said guide bar, said drive shaft being rotatably mounted relative to said frame and having a first end rotatably and pivotably mounted relative to said frame, and a second end rotatably and pivotably mounted relative to said flange;
   a friction disk slidably but not rotatably mounted to said drive shaft and rotatably driven by said friction plate such that said drive shaft is rotatably driven;
   a first bias means for pivotably biasing said flange and said friction disk about said guide bar such that said friction disk tends to frictionally engage said friction plate;
   a second bias means for biasing said friction disk in a first direction along the length of said drive shaft; and
   a speed selection means for moving said friction disk along said drive shaft, such that operation of said speed selection means in a first mode causes said friction disk to move in said first direction against said second bias means, and operation of said speed selection means in a second mode causes said friction disk to move in a second direction along said drive shaft with the assistance of said second bias means.

2. The lawn mower as claimed in claim 1, wherein said second bias means is a compression spring.

3. The lawn mower as claimed in claim 1, wherein said speed selection means includes a cable which when placed in a first tensile state may overcome said biasing of said second bias means, and when place in a second, lesser, tensile state is fed out by the assistance of said second bias means.

4. The lawn mower as claimed in claim 1, wherein a wall portion is fixed to said frame and said second bias means is a compression spring located between said friction disk and said wall portion.

5. The lawn mower as claimed in claim 1, wherein said first bias means is a compression spring.

* * * * *